`United States Patent` [19]

Weir et al.

[11] 3,768,993
[45] Oct. 30, 1973

[54] METHOD FOR REDUCTION ROASTING NICKELIFEROUS LATERITE ORES

[75] Inventors: Donald Robert Weir; Dennis G. Maschmeyer, both of Fort Saskatchewan; William J. Lavender, Edmonton, Alberta, all of Canada

[73] Assignee: Sherritt Gordon Mines Limited, Toronto, Ontario, Canada

[22] Filed: June 11, 1971

[21] Appl. No.: 152,233

[52] U.S. Cl. ............................ 75/1, 75/21, 75/82
[51] Int. Cl. ............................................ C22b 1/26
[58] Field of Search ................... 75/119, 82, 1, 21

[56] References Cited
UNITED STATES PATENTS

| | | | |
|---|---|---|---|
| 2,616,781 | 11/1952 | Forward | 75/119 X |
| 2,473,795 | 6/1949 | Hills et al. | 75/82 |
| 2,478,942 | 8/1949 | Queneau et al. | 75/82 |
| 1,487,145 | 3/1924 | Caron | 75/82 X |
| 2,400,098 | 5/1946 | Brogdon | 75/82 |
| 2,000,171 | 5/1935 | Gronningsaeter | 75/82 |
| 3,318,689 | 5/1967 | Zubryckyj et al. | 75/119 |
| 3,655,364 | 4/1972 | Evans et al. | 75/82 X |
| 2,717,829 | 9/1955 | Dougherty | 75/119 X |
| 3,146,091 | 8/1964 | Green | 75/82 |

*Primary Examiner*—L. Dewayne Rutledge
*Assistant Examiner*—M. J. Andrews
*Attorney*—Frank I. Piper et al.

[57] ABSTRACT

An improved process for roasting nickeliferous laterite ore to convert contained nickel to a leachable form wherein roasting is effected in a multiple hearth type furnace under conditions which are specifically controlled in three basic respects to substantially increase furnace throughput while maintaining a high conversion of contained nickel to a form in which it is extractable by leaching in aqueous solution. Firstly, the ore fed to the furnace is maintained continuously under reducing conditions once it has been heated above the temperature at which the water of hydration begins to be removed; secondly, the hydrogen content of the reducing gases contacting the ore within the furnace is regulated to provide very strongly reducing conditions in about the last half of the "reduction zone" of the furnace; thirdly, the ore bed depth on the furnace hearths is regulated in relation to the ore residence time in the furnace to ensure that there is sufficient time on each hearth for hydrogen gas to penetrate the major portion of the depth of the ore bed by diffusion.

As a secondary feature of the process, conversion of nickel to leachable form at greatly increased furnace capacities is further optimized by careful control of the temperature and heat-up rate of the ore within the furnace. According to still another optional modification, control of ore temperature and heatup rate are facilitated and optimum utilization of fuel used for roasting is obtained by injecting free-oxygen-bearing gas into the upper portion of the furnace to burn excess reductant.

11 Claims, 1 Drawing Figure

PATENTED OCT 30 1973
3,768,993
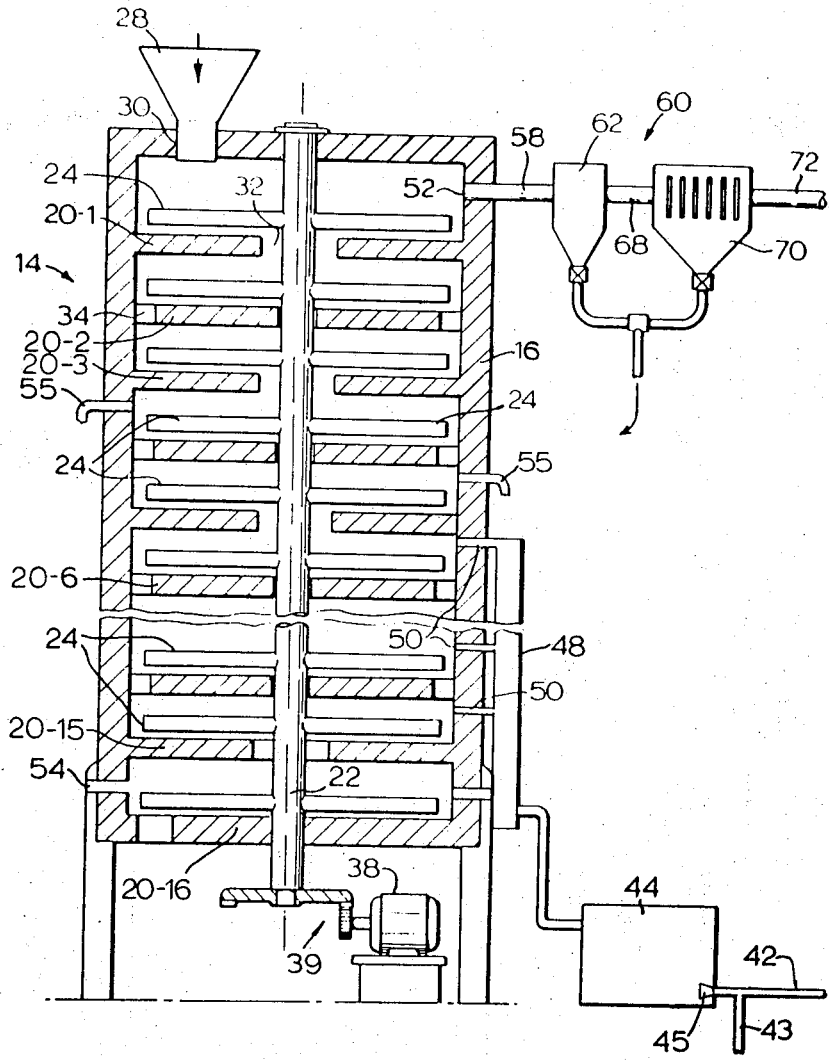
INVENTOR.
DONALD R. WEIR
DENNIS G. MASCHMEYER
BY WILLIAM J. LAVENDER
Agent

METHOD FOR REDUCTION ROASTING NICKELIFEROUS LATERITE ORES

This invention relates to the roasting of nickeliferous laterite ore to enable selective extraction of nickel therefrom by leaching with aqueous solution. More particularly, the invention is concerned with an improved method for roasting such ore in a vertical, multiple-hearth furnace whereby ore throughput is substantially increased while conversion of nickel to a leachable form is maintained at a high level.

A large proportion of the world's nickel resources are contained in oxidic and siliceous ores such as limonitic laterites, serpentine and garnierite. The recovery of nickel from these materials has long presented serious problems to the metallurgical industry. The problems result, primarily, from the fact that these types of ores generally contain only relatively small amounts of nickel, usually in the order of about 1 to 4 percent by weight, which cannot be concentrated by the conventional, relatively inexpensive ore beneficiation methods which are applicable to sulphidic ores. It therefore is necessary to treat the total bulk of the ore to recover the relatively small amounts of contained nickel.

One process, which has been commercially employed for the recovery of nickel from nickeliferous lateritic ore, involves roasting the ore under reducing conditions, using solid reductants such as coal or coke fines, or a reducing gas containing largely carbon monoxide to reduce the nickel values in the ore to a leachable state. The reduced ore is then leached in the presence of free oxygen with aqueous ammoniacal ammonium carbonate solution to extract the reduced nickel values and dissolve them in the leach solution. Undissolved residue is separated from the leach solution and the solution is treated for the recovery of the dissolved nickel values.

The conventional method for carrying out the ore reduction operation of the just-described process involves the use of vertical, multiple-hearth furnaces. The ore is fed through a "pre-heat zone," which is generally considered to comprise the first third of the furnaces in which it is heated to a temperature at which reduction of the nickel to a crude metallic state can be effected. The ore is heated by hot gases produced by the combustion of fuel in a chamber external to the furnace. The hot gases are introduced into the bottom of the furnace and at various points along its length, travel upwardly and countercurrently to the direction of travel of the ore and exit at the top of the furnace. After passing downwardly through the pre-heat zone, the ore reaches the "reduction zone" of the furnace in which heating is continued in the presence of reductants consisting mainly of carbon monoxide contained in the hot gases. The reduction zone is generally considered to comprise the last two-thirds of the furnace since the bulk of the reduction occurs therein, although a significant amount also occurs previously. The reduced ore is discharged from the furnace through an exit port at the lower end.

A highly significant factor in the overall economics of any laterite treatment process utilizing the above described roasting method is the capital and operating costs of the multiple hearth roasting equipment. Because of the very large tonnages of ore that must be treated to obtain a commercially practical rate of production of nickel, batteries of very large, e.g. 20 to 25 foot diameter and 50 to 80 foot high, multiple hearth furnaces are required to process the large volume of ore that must be treated. Such equipment can account for 20 – 30 percent of the capital and as much as a third of the operating cost of a commercial nickel production plant using a reduction roast-leach process. Accordingly, it is highly desirable in order to optimize the economics of such plants to operate the multiple-hearth furnaces at the highest possible capacity while still obtaining a high conversion of nickel to a leachable form.

A principal object of the present invention, therefore, is to provide a method for substantially increasing the capacity of multiple hearth furnaces employed for reduction roasting of nickeliferous lateritic ore.

Another object of the invention is to provide a process for roasting nickeliferous laterite ore in a multiple hearth furnace wherein the roasting conditions are controlled to maximize the furnace throughput while maintaining a high conversion of the nickel to a leachable form.

The invention is based on the discovery that the nickel content of nickeliferous laterite can be rapidly and substantially completely converted to a leachable form by reduction roasting in a multiple hearth furnace provided three basic requirements are met:

1. The ore fed to the furnace must be maintained continuously under reducing conditions once it has been heated above the temperature at which the water of hydration begins to be removed.

2. The hydrogen content of the reducing gases must be regulated to provide very strongly reducing conditions in about the last half of the "reduction zone" of the furnace.

3. The ore bed depth on the furnace hearths must be regulated in relation to the ore residence time in the furnace to ensure that there is sufficient time on each hearth for hydrogen gas to penetrate the major portion of the depth of the ore bed by diffusion.

According to the invention, the first requirement is met by ensuring that the gases in the upper portion of the furnace and exiting from the furnace, contain at least about 3 percent hydrogen by volume on a dry basis. (Throughout this specification and claims, all references to hydrogen content are by volume on a dry basis). Requirement (2) is met by maintaining the hydrogen content of the gases in the last half of the "reduction zone" of the furnace above about 25 percent. The third requirement is met by maintaining the ore bed depth on the hearths within the range of about 0.05 to about 0.085 inch for each minute of ore residence time within the furnace.

By observing the foregoing requirements, the roasting capacity of multiple hearth furnaces employed to reduction roast nickeliferous laterite ore can be increased as much as 2 or 3 times over that which has been heretofore achieved with equipment of the same size. For example, roasting capacities of 20 pounds of laterite ore per hour per square foot of effective hearth area can be readily achieved without sacrificing nickel extractions, whereas heretofore capacities of 6 – 8 pounds of ore per hour per square foot of effective hearth area were considered the maximum. This increase in capacity decreases substantially the capital cost of roasting equipment required for any given ore throughput. Operating costs are also considerably lowered because there is less heat loss per ton of ore treated and therefore less fuel oil required per ton of ore treated.

The invention also contemplates that the nickel reduction operation in a multiple hearth furnace at such increased capacities can be further optimized by maintaining, in addition to the foregoing conditions, close control of the ore temperature in each hearth of the furnace. According to this aspect of the invention, the ore is heated in the pre-heat zone up to a maximum temperature of about 1,250° F. at a rate within the range of about 35 to about 80° F. per minute after which it is maintained within about plus or minus 25 F.° of this temperature to the last hearth of the furnace.

According to another modification, the invention includes a procedure for facilitating control of ore temperature in the pre-heat zone while at the same time obtaining optimum utilization of fuel supplied to the furnace. That portion of the reducing gases in excess of the minimum requirements in the pre-heat zone of the furnace are burned by injecting a free oxygen-containing gas such as air into the furnace in the pre-heat zone. The reducing gases ignite spontaneously at temperatures as low as 700° F. Combustion of a portion of the hydrogen and carbon monoxide reductants (and methane where present) by injection of the free oxygen-containing gas results in an increase in temperature of about 200 F.° within the pre-heat zone of the furnace. The heat generated from the combustion of the gases may be usefully employed within the furnace to pre-heat the ore and the quantity of fuel required to effect heating and reduction of the ore is lowered as a result.

The invention is more fully described with reference to the accompanying drawing which is a somewhat schematic side elevation, partly in section, of a multiple-hearth furnace.

The particular ores contemplated for treatment by the process are primarily the high iron, or limonitic, laterites and the high magnesium ores such as serpentine or garnierite. The following table illustrates the normal range of composition of each of these types of ore:

TABLE 1

|  | Serpentine (Garnierite) ores % by weight | Limonite ore % by weight |
|---|---|---|
| Ni | 1.0–4.0 | 0.10–3.0 |
| Co | 0.03–0.08 | 0.05–0.25 |
| Fe | 5–18 | 35.0–60.0 |
| Cr | 0.8–2 | 1–3 |
| Mgo | 26–38 | 0.2–6.0 |
| $Al_2O_3$ | 0–6 | 0.4–10 |
| $SiO_x$ | 25–60 | 1.3–6 |
| Cao | 0.1–2 | 0.06–0.1 |
| MnO | 0.1–1 | 0.03–2.5 |

Ores of these types and naturally occurring blends of the two having intermediate compositions occur in large deposits in Cuba, Indonesia and the Philippines, for example. The raw ore normally contains 10 – 50 percent free moisture as well as water of hydration. Prior to treatment by the process of the invention, the ore is first dried by conventional drying procedures to lower the free water content. A relatively high moisture content can be tolerated in the roasting operation but an ore drier is a more efficient means for removing chemically unbound moisture than the multiple hearth furnace, so in order not to waste furnace capacity for drying it is generally desirable to lower the free moisture to below about 5.0 percent by weight in the drying operation. The coarse fraction of the dried ore is comminuted to substantially 100 percent minus 65 mesh standard Tyler screen and preferably to 80–90 percent minus 325 mesh.

In the operation of the invention, the dry ore is charged into furnace such as that illustrated in the drawing. The illustrated furnace 14 is a Herreshoff type multiple hearth furnace which consists of a cylindrical shell 16 within which 16 circular hearths 20 - 1 to 20 - 16 are disposed in vertically spaced decks. An upright central rotating shaft 22 running through the centre of the hearths carries rabble arms 24 having a plurality of downwardly extending teeth (not shown). Four rabble arms are disposed about each hearth and upon rotation of the central shaft, the teeth serve to rake the ore across the hearth.

A hopper 28 is secured to the furnace at the top. Ore is fed to the hopper and passes downwardly through drop hole 30 to the periphery of hearth 20 - 1. The ore is raked inwardly along the hearth to drop hole 32 where it falls downwardly to hearth 20 - 2. The ore is raked outwardly along hearth 20 - 2 and falls through drop hole 34 to hearth 20 - 3 and so on down.

Shaft 22 is rotated by motor 38 acting through drive gears 39 at the lower end of the shaft 22. The rate of rotation of the shaft at a given feed rate is selected to give the desired combination of depth of ore on the hearths and total retention time in the furnace.

Air and fuel supplied through conduits 42 and 43 respectively are fed to external combustion chamber 44 through mixing nozzle 45. Hot gases evolved from the partial combustion of the fuel are conducted to the furnace through distribution manifold 48 and a plurality of conduits 50 vertically spaced about the hearths of the furnace. Upon entering the furnace, the combustion gases travel upwardly through the ore drop holes heating the downwardly moving ore and exiting through port 52 and conduit 58 which extends laterally from the upper zone of the furnace. Dust particles carried upwardly with the gases also exit through conduit 58. The ore particles in the gas stream preferably are recovered in dust collection apparatus generally designated by the numeral 60. The apparatus illustrated includes a cyclone separator 62 into which the dust laden gases pass directly from conduit 58. The coarse particles of generally plus 325 mesh standard Tyler screen are removed from the gas stream and the gases from which the coarse particles have been removed pass through conduit 68 into an electrostatic precipitator 70 in which fine particles of minus 325 mesh to about 2 microns are removed. The gas from precipitator 70 preferably exits through line 72 to apparatus for recovering unspent reducing gases (not illustrated) thence to an exhaust stack. Particles removed from the gas stream by the cyclone separator and electrostatic precipitator preferably are reinjected into the furnace by means of the method and apparatus described in copending U.S. application Ser. No. 153,954.

Fuel may be natural gas or fuel oil such as Bunker "C" oil. The amount of air admitted to the combustion chamber with the fuel is restricted so that the fuel burns incompletely and gaseous reductants including hydrogen and carbon monoxide are evolved. Incomplete combustion of the fuel is necessary in order to prevent over-heating of the ore and also to avoid the necessity for exceedingly high temperature-resistant refractory linings in the combustion chamber. Substantially all the heat content of fuel which is not burned in the external combustion chamber 44 can be recovered and more efficiently utilized by partially burning it in the pre-heat zone of the furnace as is described in detail hereinbelow. An important aspect of the present invention is that, although some reductants are produced in the combustion chamber as a result of the incomplete combustion of the fuel, the external combustion chamber is utilized more as a heat source than a reductant source. Control of reductant concentration in the furnace, which is a critical feature of the invention, is obtained primarily by direct injection of hydrogen as is described in detail hereinbelow, and the operation of the external combustion chamber is controlled primarily to ensure that the heat requirements for the ore dehydration and reduction are met. In the upper third or pre-heat zone of the furnace the free water and a portion of the water of hydration is removed from the ore and the ore is heated up to the temperature at which nickel values in the ore can be reduced to a crude metallic form. The lower two thirds or reduction zone of the furnace provides the physical opportunity for reducing gas-solid ore contact to take place at the elevated temperature required for reduction. This contact is achieved by raking ore progressively across the furnace hearths over which hot reductant-containing gases pass countercurrently. It is an essential requirement according to the present invention that the ore in the pre-heat zone be maintained under reducing conditions once it has been heated above the temperature at which the water of hydration begins to be removed. In practice, this requirement is met by ensuring that the gases exiting from the top of the furnace contain at least 3 percent hydrogen and preferably between about 6 and about 8 percent hydrogen. It is essential also that very strongly reducing conditions be maintained in the lower half of the "reduction zone" of the furnace, by ensuring that the gases in this zone contain at least about 25 percent hydrogen and preferably from about 30 to 40 percent hydrogen. The required level of hydrogen in the furnace gases is obtained by injecting hydrogen gas into the furnace below the lowermost hearth. Preferably at least 90 percent pure hydrogen gas, produced for example by reforming naphtha and scrubbing to remove $CO_2$, is employed. The amount of hydrogen injected will depend on the hydrogen content of the hot gases supplied from the external combustion chamber 44 and the requirements for reduction of the ore passing through the furnace. Preferably the hydrogen is injected at least two points on opposite sides of the lowermost hearth 20-16 of the furnace through ports such as shown at 54 in the Drawing. The required level of hydrogen concentration is maintained by analyzing gas samples taken from the furance and regulating the amount of hydrogen injected accordingly. Apparatus such as described in co-pending U.S. application Ser. No. 60,785, now U.S. S. Pat. No. 3,705,478, may advantageously be used for gas sampling and analysis.

A further essential requirement for obtaining increased furnace throughput in accordance with the invention is the regulation of the depth of the ore bed on the furnace hearths in relation to ore retention time in the furnace to ensure that ore residence time on each hearth is sufficient for the hydrogen to penetrate at least a major portion of the depth of the ore bed by diffusion. It is found that this requirement can be met by maintaining the ore bed depth on the hearths within the range of about 0.05 to about 0.085 inch for each minute of ore residence time within the furnace. Thus, if ore residence time for a given furnace installation is 40 minutes, then the minimum bed depth that should be employed is 2.0 inches and the maximum 3.5 inches. If a lesser bed depth is employed then furnace capacity is being wasted since 40 minutes residence time is not required to obtain diffusion of hydrogen to the full depth of the ore bed and if a greater bed depth is employed then nickel reduction may be adversely affected since more than 40 minutes retention would be needed to permit sufficient diffusion of hydrogen into the ore bed.

As already noted hereinabove, control of the temperature of the ore within the furnace is also an important factor in obtaining maximum conversion of nickel to a leachable form while increasing the ore throughput. This is especially true where the feed is low iron ore (serpentine or garnieritic ore) or a blend of high iron ore (limonite) and low iron core. The optimum temperatures will of course be dependent upon the nature of the ore or ore blend, its grain size, the precise metallurgical process which follows the roasting operation and other factors. In general, however, the maximum temperature to which the ore should be heated is about 1,350° F. for the low iron ores or ore blends containing less than 40 wt. percent iron and about 1,250° F. for ores or ore blends containing more than about 40 wt. percent iron. Overheating of the ore is undesirable in that this results in the formation of ferrites and forsterites. The nickel in these compounds is only slowly reducible regardless of reduction conditions and therefore the furnace loading and efficiency of nickel reduction will be impaired by their formation.

The heating rate also affects the efficiency of nickel reduction, particularly for the low iron ores. Preferably the ore is heated up to a maximum temperature of about 1,250° F. at an average rate within the range of about 35° to about 70 F.°. per minute for low iron ores and about 35 – 80F.° per minute for high iron ores. In each case, after the maximum temperature is reached, the ore preferably is maintained within about plus or minus 25F.° of that temperature throughout the remainder of the reduction zone otherwise nickel reduction may be adversely affected.

In general the average temperature of the combustion gases across any hearth area in the furnace should not exceed 1,450° F. particularly in the upper portion of the furnace. The combustion gases should circulate freely through the furnace to minimize localized overheating of the ore. The limonite ore can however withstand much more localized over-heating than the serpentine or low-iron blends of serpentine and limonite. The temperature of the combustion gases and thereby the temperature of the ore within the furnace may be maintained within the desired range by careful control of the quantity of the fuel and air fed to the combustion chamber and by air injection into the pre-heat zone of the furnace as is described in detail hereinbelow. In order to monitor the temperature of the ore, use may be made of an infra-red meter which is trained onto the surface of the ore through an optical glass window cut into a valve at an inlet to the furnace. Preferably, however, measurement of ore temperature is accomplished by means of a thermocouple inserted into the ore bed upon each hearth. This method of obtaining ore temperature, which is described in detail in co-pending U.S. application Ser. No. 60,668, now U.S. Pat. No. 3,658,309, has the advantage of providing continuous and very precise indication of the actual ore temperature on any given hearth.

As indicated hereinabove, free-oxygen containing gas such as air preferably is injected into the pre-heat zone of the furnace. This serves two useful purposes: firstly, it permits recovery of some of the calorific value remaining in the gases in the top of the roaster and secondly, it facilitates the control of temperature in the pre-heat zone. Preferably air is injected into the pre-heat zone of the furnace through a plurality of nozzles, spaced about the periphery of the furnace and connected with a suitable air supply through conduits as indicated at 55 on the drawing. Preferably the spacing of the nozzles should be such that the temperature to which the gas within the pre-heat zone is raised by reaction of the reducing gases with the injected oxygen is reasonably uniform throughout the zone and undesirable local overheating is avoided. Preferably air is injected into the furnace between the 4th to 7th hearths to minimize loss of reductant concentration and maximize thermal efficiency.

To ensure combustion of the hydrogen, carbon monoxide and other reductants, the temperature of the furnace gases in the injection zone must be no lower than the auto-ignition temperature of the reductants. Satisfactory combustion of hydrogen and carbon monoxide in the furnace gases occurs when temperature of the furnace gases is about 700° F. or higher but significant amounts of water vapour in the furnace gases will increase the temperature at which these reductants will spontaneously ignite. Other reductants in the furnace gases such as methane, have a lower auto-ignition temperature.

As previously stated, it is essential in the practice of the invention that the ore be maintained under reducing conditions in the pre-heat zone of the furnace once the water of hydration begins to be removed. Thus the quantity of air or other free-oxygen-containing gases injected into the furnace must be adjusted not only to obtain heat recovery from excess reductants in the gases in the pre-heat zone but also to ensure that the reductants are not completely combusted. Maximum heat recovery and the desired reductant level in the pre-heat zone can easily be maintained by controlling the quantity of free-oxygen-containing gas injected such as to leave at least 3 percent and preferably about 6–8 percent hydrogen in the gases exiting from the furnace.

It will be appreciated that there is a substantial saving in the quantity of fuel required to heat the ore to the required temperature when air is injected in the manner described above. In one specific case, for example, air injection into the pre-heat zone decreased fuel oil requirements to 0.395 bbls/DST (barrels per dry short ton) of ore from 0.495 bbls/DST of ore fed, i.e., a decrease of 20 percent without adversely affecting nickel reduction. In addition to the advantage of fuel economy, air injection gives rise to a more uniform distribution of heat throughout the pre-heat zone in the furnace. When air is not injected into the furnace as described above, there is a tendency towards large thermal gradients in the gas phase between the flue or combustion gas inlet side of the roaster and the opposite wall. For example, variations of as much as 400 F.° from the flue side of the furnace to the other have been monitored. With air injection, temperature gradients across the furnace are greatly reduced in the pre-heat zone, usually to less than 25 percent of those monitored without air injection.

After reduction roasting and cooling the ore may be leached in accordance with any suitable methods, such as those described in Canadian Pat. Nos. 854,116 and 811,078, for example, to extract the reduced nickel values, cooling of the roasted ore should be effected in an inert or slightly reducing atmosphere, at least until the ore temperature is below about 300° F. At temperatures above this level, traces of oxidizing agents will quickly re-oxidize the finely-divided metallic nickel in the reduced ore and a subsequent loss in extraction in the leaching operation will be realized.

The invention is further illustrated by the following examples,

EXAMPLE 1

The ore feed for this example was a blend of limonitic and serpentinic laterites ground to 85 percent minus 200 mesh Standard Tyler Screen. The blend analysis for the duration of the run averaged 1.32 percent nickel, 0.11 percent cobalt, 36.9 percent iron and 13 percent bound moisture. The ore blend was fed into the top of the Herreshoff type, vertical, twelve-hearth furnace at a rate of 2,600 lbs/hr. The rabble arm rate was 0.90 r.p.m., the ore residence time in the furnace was about 35 minutes and the ore bed depth was about 2.0 inches on each hearth. On this basis, the furnace was being operated at a capacity of about 11.5 of ore per hour per square foot of hearth area.

Hot partial combustion gases, containing about 20 percent $H_2 + CO$ (dry basis), produced by partial combustion of Bunker "C" fuel oil in an external combustion chamber were fed into the furnace at hearths 12, 10, 8 and 6. Auxiliary reductant consisting of 93 percent hydrogen (dry basis) was injected below hearth 12 at the rate of 54 SCFM. Air was injected into the furnace through nozzles disposed around hearths 5 and 4 with the quantity injecting being controlled to leave between 6 and 8 percent hydrogen (dry basis) in the gases exiting from the furnace.

The temperature of the ore on the hearths was maintained within the following limits: hearth 3 – 450 to 500° F., hearth 5 – 800 to 1,000° F., hearth 7 – 1150 to 1,250° F. and hearths 8 – 11 1,225° to 1,275° F. Roasted ore exiting from the furnace was cooled to 280° F. under mildly reducing conditions and then quenched in water.

The hydrogen concentration on hearth 10 was 31 percent (dry basis), the maximum gas temperature in the furnace was 1,450° F. (at hearth 10) and the exit gas temperature was 600° F.

In the continuous operation of the furnace under the above described conditions for a 24 hour period an average of 82.2 percent of the nickel in the feed was converted to a form in which it was extracted by leaching with ammoniacal ammonium carbonate solution under oxidizing conditions. The average metallic iron content of the reduced ore was 3.5 wt. percent.

EXAMPLE 2

For purposes of comparison, four test runs were made using substantially the same conditions as those used in the preceding example except that a different condition was varied for each run, as follows:

a. Test No. 1:

auxiliary hydrogen injection into hearth 12 was decreased to 18 SCFM and hydrogen concentration at hearth 10 was correspondingly lowered to 11 percent.

b. Test No. 2:

the quantity of air injected into the pre-heat zone was increased to leave 5.1 percent hydrogen in exit gases.

c. Test No. 3:

the ore temperature on hearth No. 3 was increased to a temperature between about 950° – 1051° F. and on hearths 5 to a temperature between 1,200 and 1,300° F. resulting in a heating rate in pre-heat zone in excess of 100 F.°/min.

d. Test No. 4:

the ore bed depth was increased to 3 inches.

The results of these runs and the affect of each of the variables tested on nickel extraction are shown in the following table:

| Test No. | Time of run (hrs.) | Process condition evaluated | Average Nickel Extraction |
| --- | --- | --- | --- |
| 1 | 23.3 | H₂ concentration in reduction zone | 75.7 |
| 2 | 22.3 | H₂ concentration in pre-heat zone | 79.3 |
| 3 | 24.0 | Temperature and heating rate in pre-heat | 72.8 |
| 4 | 22.5 | Ore bed depth on hearths | 80.6 |

What we claim as new and desire to protect by Letters Patent of the United States is:

1. The method of treating nickeliferous laterite ore to render the nickel content thereof amenable to selective extraction therefrom by leaching with aqueous solution which comprises: feeding said ore to a vertical multiple hearth furnace in which the ore passes downwardly through a pre-heat zone in the upper part of the furnace and then through a reduction zone below said pre-heat zone; passing a stream of hot gases produced by the partial combustion of fuel counter-current to said ore and in contact therewith to heat the ore to the temperature required for reduction of contained nickel to a leachable form; injecting hydrogen into the furnace at the bottom of the reduction zone in amount sufficient to maintain the hydrogen concentration in the gases contacting the ore in the lower half of the reduction zone above about 25 percent by volume (dry basis); maintaining the hydrogen content of gases exiting from the furnace above about 3 percent by volume (dry basis); controlling the rate of throughput of ore through the furnace such that depth of ore on each of the furnace hearths is within the range of about 0.05 to about 0.085 inch for each minute of ore residence time within the furnace; cooling and recovering the roasted ore exiting from the furnace.

2. The process according to claim 1 wherein the hydrogen content in the lower half of the reduction zone is maintained between 40 and 45 percent.

3. The process according to claim 2 wherein the hydrogen is injected as at least 90 percent, pure hydrogen gas.

4. The process according to claim 1 wherein the average temperature across any hearth of the hot gases contacting the ore is not permitted to exceed 1,450° F.

5. The process according to claim 1 wherein the ore temperature is not permitted to exceed 1,350° F. where the ore fed to the furnace contains less than 40wt. percent iron and is not permitted to exceed 1,250° F. where the ore fed to the furnace contains more than 40 percent iron.

6. The method according to claim 1 wherein the ore is heated to gradually reach a temperature of about 1,250° F. by the time it has traversed the pre-heat zone and is then maintained within plus or minus about 25 F.° of said tamperature as it traverses the reduction zone.

7. The process according to claim 1 wherein a free-oxygen-containing gas is injected into the pre-heat zone of the furnace to ignite and burn a portion of the reductants contained in the hot gases passing through said zone.

8. The process according to claim 7 wherein the free-oxygen-containing gas is air.

9. The process according to claim 8 wherein the quantity of air injected is controlled to maintain the hydrogen content of the gases exhausting from the furnace within the range of about 6 to 8 percent hydrogen by volume (dry basis).

10. The process according to claim 8 wherein the air is injected in amount sufficient to maintain the average ore heat-up rate within the range of 35 to 80 F. degrees/min. where the ore fed to the furnace contains more than 40 wt. percent iron and within the range of 35 to 70 F degrees/min. where the ore fed to the furnace contains less than 40 wt. percent iron.

11. The process according to claim 1 wherein the roasted ore exiting from the furnace is cooled to below 300° F. under mildly reducing conditions.

* * * * *

UNITED STATES PATENT OFFICE
CERTIFICATE OF CORRECTION

Patent No. 3,768,993          Dated    October 30, 1973

Inventor(s) DONALD ROBERT WEIR, ET. AL.

It is certified that error appears in the above-identified patent and that said Letters Patent are hereby corrected as shown below:

Column 6, line 18, "core" should read -- ore -- . Column 8, line 24, "Herreshofftype" should read -- Herreshoff-type -- .

Signed and sealed this 6th day of August 1974.

(SEAL)
Attest:

McCOY M. GIBSON, JR.                C. MARSHALL DANN
Attesting Officer                   Commissioner of Patents